_United States Patent Office_ 3,051,819
Patented Aug. 28, 1962

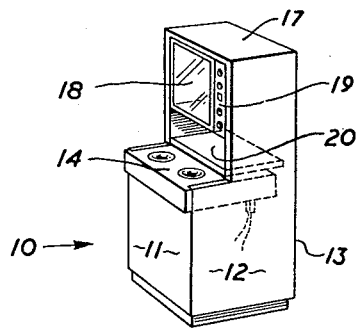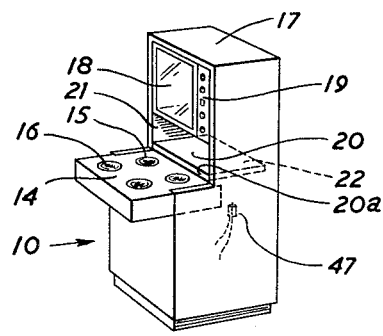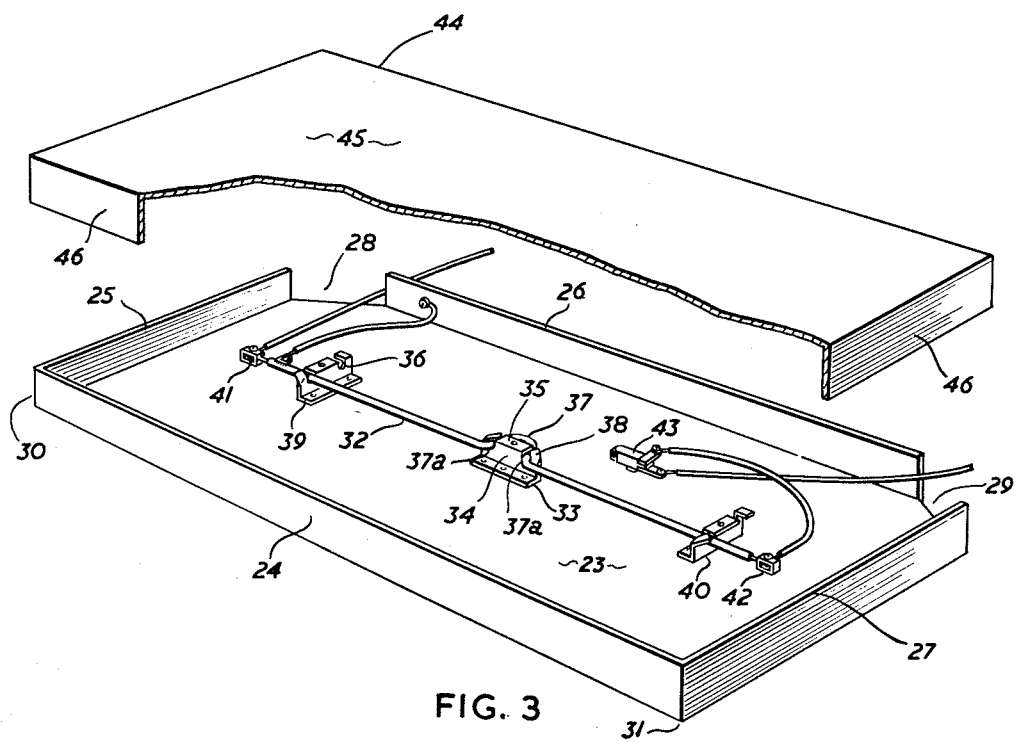

3,051,819
WARMER SHELF
David Gibbons Smith, Toronto, Ontario, Canada, assignor to Moffats Limited, Weston, Ontario, Canada
Filed Oct. 10, 1960, Ser. No. 61,688
3 Claims. (Cl. 219—37)

This invention relates to cooking units and in particular to an electric stove of the type known in the trade as a "high oven range."

In recent years the art has developed a type of electric cooking stove which is characterized by the fact that it is provided with an oven which normally occupies a position above a horizontal surface cooking assembly rather than below the cooking surface as was the case with previously designed conventional units. As an example of a typical high oven range, reference may be had to U.S. Design Patent No. 174,240 of March 15, 1955, and U.S. Design Patent No. 180,069 of April 16, 1957.

The present invention has as its object the provision of a plate warming shelf which may be associated with a cooking stove having these general features and which makes use of space which, in the prior art, was not put to good advantage.

The present invention will be described in detail with reference to a single embodiment which is illustrated in the accompanying drawings in which like reference numerals denote like parts in the various views and in which:

FIGURE 1 is a perspective view of a high oven range showing the horizontal surface cooking assembly in its retracted position;

FIGURE 2 is a view similar to FIGURE 1 showing the horizontal cooking assembly in its extended position, and FIGURE 3 is an exploded view of the plate warming shelf which may be seen in FIGURES 1 and 2.

Referring now particularly to the drawings, it will be seen that the cooking stove shown in FIGURES 1 and 2 comprises first of all, a base 10 which, specifically, is comprised of a front wall 11, two side walls 12 (only one of which may be seen in FIGURES 1 and 2) and a rear wall 13 (only the edge of which may be seen in FIGURES 1 and 2).

The upper surface of the base 10 is constituted by a horizontally slidable cooking surface 14 which carries, on its upper surface, a plurality of heating elements, which includes at least one first heating element 15 adjacent the rear wall 13 of the base and at least one second heating element 16 adjacent the front wall 11 of the base.

In the embodiments shown in FIGURES 1 and 2 there are two first heating elements 15 and two second heating elements 16.

The first and second heating elements 15 and 16 are carried on the horizontally slidable cooking surface 14 which may be constructed in the form of a drawer and which may be movable forwardly and rearwardly of the base 10 on suitable glides, tracks, ways or other mounting mechanisms all of which are well known in this and analogous arts.

Above the cooking surface 14 there is provided an oven which may be seen at 17 and which is provded with a door 18 whereby access to the interior of the oven may be attained. A suitable control panel 19 is also provided having the usual switches, temperature indicator, clocks and other controls which normally form an essential and integrated part of a modern electrical cooking stove.

So far as the invention has already been described, it is conceded that the construction and general arrangement of parts is well known in the trade.

According to the present invention, however, a plate warming shelf 20 is provided between the oven 17 and the cooking surface 14 and it is suitably mounted between walls 21 and 22 which extend upwardly from the base to support the oven 17 in its vertically spaced position above the horizontal cooking surface 14. The plate warming shelf 20 lies immediately above the horizontally slidable cooking surface 14 and the upper surface of the plate warming shelf is obviously adapted to receive plates and other articles which it may be desired to keep warm during the process of preparing a meal.

Referring now to FIGURE 3, the plate warming shelf itself will be seen to comprise a first lower portion having a bottom wall 23 and four low upstanding side walls 24, 25, 26 and 27. The upstanding side walls may either terminate short of their point of intersection as, for example, shown at 28 and 29 or may meet and join with one another as shown at 30 and 31.

Within the lower portion so formed, there is mounted an electrical heating element which is generally linear in configuration and which is shown at 32. The mounting members for the heating element 32 are all identical and consist of a first flange 33 which may be spot welded to the surface 23, an upstanding flange 34 and a horizontal flange 35. The horizontal flange 35 and a portion of the vertical flange 34 are provided with slots as may be seen, for example, at 36 in the left-hand mounting member. The generally linear heating element 32 is provided with a U-shaped looped portion 37, at substantially its midpoint, and the two arms 37a of the looped portion 37 lie in the notches 36 and the tabs 38 in the upper flange 35 are bent over to engage the heating element 32. An identical mounting construction is employed at 39 and 40 where the two ends of the heating elements 32 are received and supported. Since the heating elements heat and cool, it is necessary to provide for expansion and, accordingly, the supports 39 and 40 which engage the ends of the heating element 32 engage it only relatively loosely so that the element may slide relative to the support to accommodate expansion and contraction of the element.

Terminal means 41 and 42 are associated with the ends of the element 32 and a thermostat 43 is carried by the lower portion and is electrically connected in series with the heating element 32 and with a source of electric power which is not shown. The thermostat 43 is spaced from the heating element 32 so that it will be influenced by the average temperature of the warming shelf rather than by the localised relatively high temperature of the heating element itself.

The lower portion of the warming shelf is enclosed by a cover portion 44 which overlies and encloses the lower portion. The cover portion 44 is provided with a flat surface 45 which constitutes the surface upon which the articles to be warmed by the warming shelf are placed and a plurality of downwardly extending side walls 46 only two of which are partly shown in FIGURE 3.

Returning now to FIGURES 1 and 2 it will be seen that the warming shelf disclosed in FIGURE 3 is mounted between side walls 21 and 22 of the space between the oven 17 and the base 10. The shelf 20 lies closely spaced above the horizontal sliding cooking surface 14 and it will immediately be apparent that means must be provided to prevent the energization of the first heating elements 15 when they are in the retracted position as shown in FIGURE 1 and lie beneath the warming sheft 20. This means is provided in the form of a cut out switch 47 which is carried by the base and which lies in the path of the horizontal slidable cooking surface 14.

The switch 47 is connected in the circuit controlling the first heating elements 15 in such a manner that when the horizontal sliding cooking surface 14 is in the position shown in FIGURE 1, the elements 15 are out of circuit and may not be energized. When the cooking elements are exposed as shown in FIGURE 2, they are then in circuit and may be energized by the closing of the normal switch means provided for that purpose. The switch 47 may be of the "normally closed" type which is opened when the horizontally sliding cooking surface 14 is in the position shown in FIGURE 1 or, alternatively, it may be of the normally open variety which is closed when the horizontally sliding cooking surface is in the position shown in FIGURE 2.

The switch 47 is so positioned that it is contacted by a suitable abutment carried by the horizontally sliding cooking surface 14 at the moment that the edge of the first elements 15, which lies adjacent the rear wall 13 of the base, moves under the forward edge 20a of the shelf 20. It will be operative, of course, to de-energize and render inoperative the first elements 15 within any position lying between a position where the rear edge of the elements 15 lies beneath the forward edge of the shelf 20 and the first extreme position of the horizontally sliding cooking surface 14 which is shown in FIGURE 1.

The invention has been described by way of example with reference to a single preferred embodiment which is shown in the accompanying drawings. Minor modifications and variations in particular structure are contemplated within the spirit of the present invention and the scope of the sub-joined claims.

What I claim as my invention is:

1. In a cooking device having a base including a front wall, a rear wall, and two side walls, a horizontally slidable cooking surface constituting the top wall of the base, an oven above the base and vertically spaced from the cooking surface, the oven being supported by side walls extending upwardly from the base which define, with the oven and the base, a forwardly opening enclosure; a fixed horizontal warmer shelf in the enclosure beneath the oven and immediately above the cooking surface, the cooking surface having at least one first heating element adjacent the rear wall of the base and at least one second heating element adjacent the front wall of the base, the horizontally slidable cooking surface being movable between a first extreme position in which the first heating element on the cooking surface is concealed beneath the warmer shelf and a second extreme position in which both the first and the second heating elements are exposed, an electric heating element in the warmer shelf lying generally along the center line of the warmer shelf and mounted in spaced relationship to the horizontal upper surface of the shelf and electrically connected in series with a thermostat also located in the warmer shelf, a switch located outside the warmer shelf and a source of electric power, and switch means on the base to be engaged by the slidable cooking surface as it approaches the first extreme position to render the first heating element inoperative while it lies between a position in which the edge thereof adjacent the rear wall of the base moves beneath the forward edge of the shelf and the first extreme position of the cooking surface.

2. A cooking device as claimed in claim 1 wherein the warmer shelf comprises a first lower portion having a bottom surface and four low upstanding side walls, a first mounting bracket centrally located on the bottom surface and adapted to firmly engage a generally linear heating element at approximately its midpoint, two second mounting brackets each adapted loosely to receive one end of the heating element, electrical termnial means associated with the ends of the heating element, an electric thermostat mounted on the bottom surface of the shelf and spaced from the heating element, and electrically connected in series with the heating element and a cover plate adapted to lie upon and enclose the lower portion of the warmer shelf while remaining in spaced relationship with the heating element.

3. A cooking device as claimed in claim 2 wherein the heating element is generally linear and has a U-shaped loop centrally located therein by which the heating element is firmly engaged with the first mounting member.

References Cited in the file of this patent

UNITED STATES PATENTS

| | | |
|---|---|---|
| 1,955,203 | Salomon | Apr. 17, 1934 |
| 1,989,749 | Fullerton | Feb. 5, 1935 |
| 2,522,002 | Stephan | Sept. 12, 1950 |
| 2,526,476 | Ham | Oct. 17, 1950 |
| 2,919,339 | Hilliker | Dec. 29, 1959 |
| 2,972,036 | Pollock et al. | Feb. 14, 1961 |